Jan. 13, 1925. 1,523,084
E. W. A. SCHEUNEMANN
ROAD BUILDING AND REPAIRING MACHINE
Filed Jan. 28, 1924
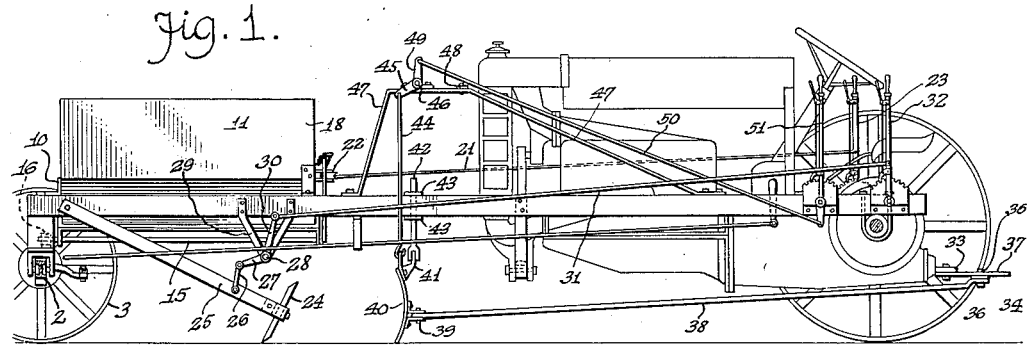
Fig. 1.
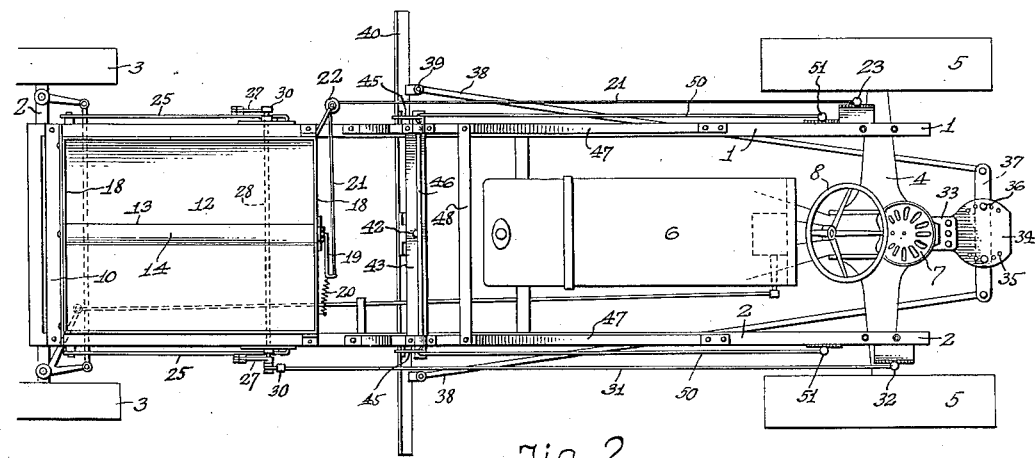
Fig. 2.
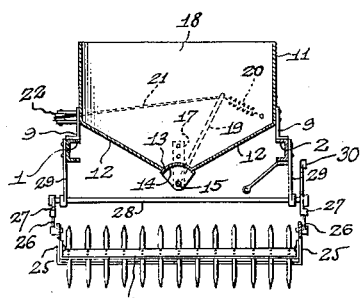
Fig. 3.
Fig. 4.
Inventor
Edward W. A. Scheunemann,
By
Attorneys Patented Jan. 13, 1925.

1,523,084

UNITED STATES PATENT OFFICE.

EDWARD W. A. SCHEUNEMANN, OF NEW HAVEN, MICHIGAN.

ROAD BUILDING AND REPAIRING MACHINE.

Application filed January 28, 1924. Serial No. 689,170.

*To all whom it may concern:*

Be it known that I, EDWARD W. A. SCHEUNEMANN, a citizen of the United States, residing at New Haven, in the county of Macomb and State of Michigan, have invented certain new and useful Improvements in Road Building and Repairing Machines, of which the following is a specification, reference being had therein to the accompanying drawings.

This invention relates to a road building and repairing machine, and my invention aims to provide a tractor with implements that may be used for building and repairing roads, the tractor having a hopper or dump body in which material may be placed that is used in the repair of a road, or in which material may be placed that is to be removed from the road.

My invention further aims to provide a road machine embodying an agitator and scraper with both implements arranged to be adjusted by the operator of the machine, and with such a machine considerable time and labor are saved in the building or repairing of a road.

The construction of my road building and repairing machine will be hereinafter described and then claimed, and reference will now be had to the drawing, wherein—

Figure 1 is a side elevation of the road machine partly broken away and partly in section;

Fig. 2 is a plan of the machine;

Fig. 3 is a cross sectional view of the forward end of the machine, showing the agitator and body, and Fig. 4 is a cross sectional view of the machine showing a road scraper.

In the drawing, the reference numerals 1 and 2 denote chassis frames having a front axle assembly 2 with steering ground engaging wheels 3, and at the rear ends of the chassis frames 1 and 2 is a rear axle assembly 4 including driven ground engaging wheels 5. On the rear portion of the chassis is a conventional form of tractor power plant 6 from which the rear ground engaging wheels 5 are driven, and behind the power plant 6 is a seat 7 for a driver or operator, and a steering column assembly 8 by which the machine may be steered and controlled by the driver thereof.

The tractor machine has a long wheel base with the tractor power plant 6 occupying the rear portion of the chassis and on the forward ends of the chassis frames 1 and 2 are side brackets 9 and a front end support 10 for a hopper or body 11, which has inclined bottom walls 12 providing a longitudinal discharge opening 13. This discharge opening is adapted to be closed by a pivoted arcuated shutter-like closure 14 mounted on a longitudinal rock shaft 15 journaled in a bearing 16 and a hanger 17, the former being on the front axle assembly 2 and the latter depending from the rear end wall 18 of the body 11. On the rear end of the rock shaft 15 is a long crank 19 connected by a coiled retractile spring 20, to the wall 18, the retractile force of the spring holding the closure 14 normally closed.

The long crank 19 is connected to the end of the flexible member 21, as a cable, which is trained around a sheave or grooved pulley 22 supported from the end wall 18 at the side of the body 11. The flexible member 21 extends rearwardly and is connected to an operating lever 23 for a pawl and rack locking mechanism which permits of the operating lever 23 being held in adjusted position. This operating lever is convenient to the seat 7 so that the machine operator may readily control the closure 14 and if necessary set said closure for a gradual discharge of road building material, as the machine is moved over a road.

Under the body 11, contiguous to the rear end thereof, is a toothed reversible digger or agitator 24 having tines somewhat similar to a toothed harrow. This agitator is disposed transversely of the machine and has side arms 25 pivotally connected to the forward ends of the chassis frames 1 and 2. The side arms 25 are loosely connected by links 26 to the cranks 27 of a rock shaft 28, said rock shaft being journaled in hangers 29 depending from the frames 1 and 2. On one end of the rock shaft 28 is a crank 30 pivotally connected by a long reach rod 31 to an operating lever 32 supported at the rear end of the chassis frame 2, said operating lever being similar to the operating lever 23, which is supported from the rear end of the chassis frame 1. By adjusting the operating lever 32 the agitator 24 can be raised and lowered relative to the surface of the road and consequently may be set so that its teeth will extend into the road surface a desired depth and loosen the road surface sufficiently to permit of the loosened material being scraped, either to one side or for complete removal from the road surface.

At the rear axle assembly 4 there is the usual connecting member 33 by which implements or vehicles may be drawn by the tractor and attached to this connecting member is a coupling member 34 having a series of openings 35 for the fastening means 36 of a draft bar 37 which may be set in parallelism with the axis of the rear axle assembly 4 or may be set at an angle thereto. Pivotally connected to the ends of the draft bar 37 are push rods 38 which extend forwardly at diverging angles and are pivotally connected, as at 39, to the rear face of a convexo-concave transversely disposed scraper 40 suspended under the middle portion of the machine. The central portion of the scraper 40 is loosely connected, as as 41, to a guide pin 42 extending upwardly through the transverse member 43 connecting the chassis frames 1 and 2.

Attached to the upper edge of the scraper 40 adjacent the ends thereof, are suspension rods 44 pivotally connected to the end cranks 45 of a rock shaft 46 supported on side frames 47 mounted on the frames 1 and 2. The side frames are connected by a transverse member or members 48 and said frames are of such configuration as to receive any shocks incident to a scraping operation.

The rock shaft 46 has end cranks 49 connected by side rods 50 to operating levers 51, said levers being similar to the levers 23 and 32 and supported from the frames 1 and 2 so that either or both of said levers may be manipulated by the driver of the machine.

It is through the medium of the draft bar 37 and the push rods 38 that the scraper 40 may be set to divert material to one side or the other of the road, and it is through the medium of the elements 44 to 51 inclusive that either or both ends of the scraper may be raised or lowered. In consequence of such adjustment the surface of the road may be scraped during building or repairing, and if the scraped material is to be removed it can be shoveled into the body 11 to be carried away, probably to some point along the road for filling in purposes.

My road building and repairing tractor machine has been designed for use by State and county road commissions and my machine will obviate the necessity of using separate implements and vehicles, also save considerable time and labor incident to the building or repairing of a road.

Throughout the construction of the machine I use standard structural steel and a well known tractor, it being only necessary to change the chassis of such tractor and substitute therefor the chassis frames of my machine.

While in the drawing there is illustrated a preferred embodiment of my invention, it is to be understood that the structural elements are susceptible to such variations and modifications as fall within the scope of the appended claims.

What I claim is:—

1. A road building and repairing attachment adapted to be applied to a Fordson tractor by separating the front axle assembly from the power plant of the tractor comprising a frame connected to the tractor power plant and the front axle assembly, a body on the front end of said frame, said body having inclined bottom walls providing a discharge opening, a pivoted closure for the discharge opening of said body, an adjustable agitator under said body, an adjustable scraper under said frame and means operable at the rear end of said tractor adapted for opening and closing said closure and adjusting said agitator and scraper.

2. A road building and repairing attachment adapted to be applied to tractors having front and rear axle assemblies without changing their construction, comprising a frame serving as a long connection between axle assemblies, a coupling member at the rear axle assembly, a draft bar attached to said coupling member, push rods attached to said draft bar, a scraper suspended from said frame and connected to said push rods, means at the rear axle assembly adapted for raising and lowering the scraper, and an agitator supported from said frame at the front axle assembly and adjustable from the rear axle assembly.

3. A road machine as called for in claim 2, and a body on the forward end of said frame adapted for holding road material.

4. A road building and repairing machine comprising a tractor construction having rear axle assembly and a front axle assembly, a long chassis adapted to connect said axle assemblies, a body on the forward end of the chassis in front of the tractor construction, an adjustable agitator under said body, an adjustable scraper under said chassis behind said agitator and in advance of the tractor construction, and means adjacent the rear axle assembly adapted for independently adjusting said agitator and scraper.

In testimony whereof I affix my signature in presence of two witnesses.

EDWARD W. A. SCHEUNEMANN.

Witnesses:
 KARL H. BUTLER.
 ANITA M. DORR.